(12) United States Patent
Mir

(10) Patent No.: US 6,938,081 B1
(45) Date of Patent: Aug. 30, 2005

(54) METHODS AND SYSTEMS FOR MANAGING NETWORK INFRASTRUCTURE CHANGE INCLUDING OBTAINING APPROVAL FOR THE NETWORK INFRASTRUCTURE CHANGES

(75) Inventor: Majid Mir, Irving, TX (US)

(73) Assignee: Level 3 Communications, Inc., Broomfield, CO (US)

( * ) Notice: Subject to any disclaimer, the term of this patent is extended or adjusted under 35 U.S.C. 154(b) by 660 days.

(21) Appl. No.: 09/602,665

(22) Filed: Jun. 26, 2000

Related U.S. Application Data

(60) Provisional application No. 60/141,919, filed on Jun. 30, 1999.

(51) Int. Cl.[7] .......................... G06F 15/173; G06F 9/44
(52) U.S. Cl. ....................................... 709/223; 717/171
(58) Field of Search ................................ 709/220, 221, 709/222, 223, 224, 225, 226; 717/171; 707/10, 707/102

(56) References Cited

U.S. PATENT DOCUMENTS

| | | | | |
|---|---|---|---|---|
| 5,581,764 | A * | 12/1996 | Fitzgerald et al. | 709/223 |
| 5,867,713 | A * | 2/1999 | Shrader et al. | 717/176 |
| 5,918,226 | A * | 6/1999 | Tarumi et al. | 707/10 |
| 6,003,011 | A * | 12/1999 | Sarin et al. | 705/9 |
| 6,061,735 | A * | 5/2000 | Rogers | 709/239 |
| 6,341,287 | B1 * | 1/2002 | Sziklai et al. | 707/102 |
| 6,381,644 | B2 * | 4/2002 | Munguia et al. | 709/225 |
| 6,496,850 | B1 * | 12/2002 | Bowman-Amuah | 709/203 |
| 6,535,913 | B2 * | 3/2003 | Mittal et al. | 709/219 |
| 6,539,386 | B1 * | 3/2003 | Athavale et al. | 707/10 |
| 6,574,661 | B1 * | 6/2003 | Delano et al. | 709/223 |

OTHER PUBLICATIONS

Painter et al., A Methodology for Intergrating Business Process and Information Infrastructure Models, 1996, IEEE, pp. 1305-1302.*
Shi et al., Workflow Management Systems: Survey, IEEE, Oct. 1998, pp. 05-01-05-05*
Krishnan et al., An Automated Techinque for Designing and Improving Provisioning Processes, IEEE, pp. 329-338.*

* cited by examiner

Primary Examiner—Larry D. Donaghue
(74) Attorney, Agent, or Firm—Faegre & Benson LLP

(57) ABSTRACT

The systems, methods, and means described herein are designed to promote the efficient and prompt approval of proposed changes to a network and the effective implementation of customer notification of those proposed changes among other things. Specifically, the systems, methods, and means described herein include steps for creating a change plan that comprises instructions that meet minimum requirements about how a change is to be performed, organizing a change into one of a plurality of change categories based on the nature of the change to be performed, providing said change plan to affected entities for approval, and implementing said change plan after said approval has been provided. In carrying out these steps, the change category provides rules about who should be selected as affected entities, how the affected entities should be notified of the change, and the structure that should be utilized for organizing the change.

11 Claims, 7 Drawing Sheets

FIGURE 4

X-Sender: koneill@po2.bbn.com
X-Mailer: Windows Eudora Pro Version 3.0.1 (32) Date: Wed, 29 Oct 1997 13:08:23-0500
To: change-approve@bbnplanet.com
From: Karen O'Neillkoneill@bbn.com
Subject: CMR: S1, Fridge cutover, 11/23/97, 12:15am-8:15am EST, #156483 Cc: dss@po2.bbn.com, jburke@po2.bbn.com, smorin@po2.bbn.com, lcamera@po2.bbn.com, jblieden@po2.bbn.com, hdstaff@po2.bbn.com, copr-sysadmin@po2.bbn.com, planet-geeks@bbnplanet.com GTE Internetworking
Change Request Form
(Version 2.2.1)

401→ Change Sponsor: Karen O'Neill
403→ Change Author: John DeBella

405→ Change Coordinator: John DeBella
407→ Change Agents: John DeBella

409→ Change Request (Ticket) Number: 1456830
411→ Facility Name: Corporate I/T Data center Service Element: fridge.bbnplanet 413 → Start Date: 11/23/97
      Start Time: 11/23/97 00:15 EST
      End Time: 11/23/97 08:15 EST 415→ Impact Type (Down hard/outage, potential outage, degradation or none); Down hard/outage 417→ Impact Duration (per customer and/or service element): 8 hours 419→ Impact Statement: fridge.bbnplanet.com (aka. Freezer.bbnplanet.com and icebox.bbnplanet.com) will be unavailable. All services and home directories dependant on fridge.bbnplanet.com will be impacted. Servers and desktops which mount fridge will be impacted such as Pasilla, Poblano, Cayenne, Moho, Captain-Crunch, Fresno, etc.

421→ Change Category (E1, E2, S1, S2, S3, U1, U2,): S1← 422

423→ Risk (Low, Medium, High): High

425→ Priority (Must, Important, Nice): Important

427→ Summary of Change: Cutover NFS services from fridge.bbnplanet.com (a/k/a freezer.bbnplanet.com and icebox.bbnplanet.com) to SUN hardware solution.
Reboots of pasilla, poblano, cayenne, moho, captain-crunch, nis, fresno will be required during this downtime. A schedule of re-boots will be available and communicated.

429→ Benefit Statement: Provide an NFS solution that is more expandable, more redundant and better supported.

FIGURE 5

431→ Reason for Change: Provide an NFS solution that is more expandable, more redundant and better supported.

433→ Success criteria: The new hardware architecture (the Sun server and storage array) boots up as fridge.bbnplanet.com, freezer.bbnplanet.com, and its exported files systems are available and mountable by its clients.

435→ Contingency Planning: Fail back to original Fridge server (Network Appliance system).

437→ Notification:

internal: all-staff@bbnplanet.com, turnover@bbn.com, hdstaff@bbn.com external:

439→ Database and/or DNS change: None.

441→ Equipment: Fridge.bbnplanet.com (a/k/a freezer.bbnplanet.com, icebox.bbnplanet.com)

443→ Change Plan: A cutover plan will be made available and communicated appropriately.

Note- Upon change author's completion of this form, please send your respective change sponsor who will review and submit to "change-approve".

FIGURE 6
Change Schedule

| Ticket # | Start Date | Start Time | End Time | Outrage Duration | Cal | tiPriority | Brief Description | Internal/External Notification | Customer Impact (# of, etc.) | Change Coordinator (& # of Pager) | Routing (DNS) or Database Issues | Dependencies |
|---|---|---|---|---|---|---|---|---|---|---|---|---|
| 12345 | 12/31/96 | 0300 | 0700 | 15 minutes | S1 | Important | Load new version of Cisco Software into Cambridge 1-br1. | Ner_tech_customer -contact Ner_att_ tech_customer_contact | 700 | Clark | No | N/A |
| N/A | Ongoing | 0300 | 0700 | | S3 | Must | Nightly BGP Reset | | | Kennedy | No | N/A |

Change Categories Matrix

| | Category | Description | Period For work | Notification of GNOC | Advance Customer Notification | Mgmt. Approval |
|---|---|---|---|---|---|---|
| 701 → | E1 Event Response | Work necessary to address a customer-impacting event. The change to correct the event has the potential to affect more customers or to extend duration more than presently affected by the event. | As required | Change coordinator contacts GNOC prior to beginning work. | As much as possible. | Expedited |
| 703 → | E2 Event Response | Work necessary to address a customer-impacting event. The change to correct the event will not affect more customers or extend duration more than is presently affected by the event. | As required. | Change coordinator contacts GNOC prior to beginning work. | As much as possible. | No |
| 705 → | S1 Scheduled | Work of high risk or that causes or is likely to cause a service outage or degradation lasting greater than 15 minutes. Potential for: Uncertain results Non-localized impact exceeds maintenance window includes introduction of new procedures and/or elements. | Fri, Sat or Sunday 0000-0600 Local Time | Planned Ticket Change coordinator contacts GNOC just prior to beginning work | 10 business days | Review Meeting |
| 707 → | S2 Scheduled | Work of medium risk or that causes or is likely to cause a localized service outage or degradation lasting between 10 and 15 minutes. Reasonably predictable results. Unlikely to: Exceed maintenance window Create wider than anticipated impact | Fri, Sat or Sunday 0000-0600 Local Time | Planned Ticket Change coordinator contacts GNOC just prior to beginning work | 10 business days | Review Meeting |
| 709 → | S3 Scheduled | Work of low risk or that causes or is likely to cause a localized service outage or degradation lasting less than 10 minutes. Implementing previously tested solutions with no unanticipated results. | Fri, Sat or Sunday 0000-0600 Local Time | Planned Ticket Change coordinator contacts GNOC just prior to beginning work | 6 business days | Expedited or Review Meeting |
| 711 → | U1 Unscheduled | Work that is commonplace yet not in formal procedures presenting low to no risk of service outage or degradation. (Example: InfraEng requesting routing change to a pre-production router). | Where possible 2100 to 0800 Local Time | Planned Ticket Change coordinator contacts GNOC just prior to beginning work | N/A | No |
| 713 → | U2 Unscheduled | U2s are derived from a list of approved U2s (on iweb in Change Management area). Routine or scripted work, presenting low to no risk of service outage or degradation. Repetitive and/or completely automated work. (Example: Customer Provisioning work). | Ongoing | Trap to GNOC, if applicable, or other audit trail. | N/A | Expedited To add to, or change work in, this category |

715 → 718 → 721 → 723 → 725 → 727 →

NOTE: Local Time "Consideration" - When change activity impacts across multiple time zones, the work is done on Greenwich Time. Changes to the schedule (or scope of impact) for work that occurs on a recurring/published schedule (i.e., nightly BGP reset) require review and approval at the review/lock-down meeting. In the case of change activity that impacts only one customer, the time-frame of work, including advance notification, can be negotiated with the specific customer.

METHODS AND SYSTEMS FOR MANAGING NETWORK INFRASTRUCTURE CHANGE INCLUDING OBTAINING APPROVAL FOR THE NETWORK INFRASTRUCTURE CHANGES

CROSS REFERENCE TO RELATED APPLICATION

This application claims priority from U.S. Provisional Application Ser. No. 60/141,919, filed Jun. 30, 1999, which is herein incorporated by reference.

BACKGROUND OF THE INVENTION

1. Field of the Invention

The invention relates to methods and systems for managing changes to the infrastructure of a computer network, and more particularly, to methods that coordinate the activities of the entities that will participate in, approve of, or be affected by the infrastructure change.

2. Description of Related Art

Changing the infrastructure of a portion of a network can impact on the performance and operation of the entire network. Today, however, changes to the infrastructure of a network, such as the installation or upgrading of new hardware or software, occur largely without notice to, or input from, other network technicians working on the network, not to mention the users that employ the network on a daily basis. The present approach is generally a ramshackle collection of notifications where individuals attempt to notify parties they think should be notified without any clear pattern or organization in their activity. The present approach can often fail to communicate changes to other network participants, including technicians and users who are likely to be affected by the change, and can also result in complex changes not receiving sufficient approval, while simple changes become bogged down in an over-extensive approval process. This failure to communicate impacts negatively on the ability to efficiently change a network, and can result in the failure of a network to be operated as desired.

Changes to a network can also result in loss of service to many users at inopportune times and can result in the entire network appearing unreliable to customers. In order to provide change in an appropriate manner, it is helpful to insure that all entities that may be affected by the change have a say in the change. In the current system, however, it can be difficult to insure that the myriad of customers, internal users, or management personnel affected by the change are all notified of the change, and that even when they are notified, any potential concerns are addressed as part of the change process. Since such notification is lacking, the current systems often result problems caused by the change process which would have been easily avoided if the affected parties had been notified of the change.

Current systems also fail to promote advance preparation by the customer in expectation of potential problems; encourage customers in finding alternate means to conduct business during a change; supply notification to affected parties of lapse in or impact on services provided internally; present opportunities for parties to request reconsideration of the time for or necessity of change if the change will result in a disproportionate impact; provide proper planning to gracefully carry out change, respond to problems with a change, and review impacts of change; and/or encourage the creation and use of standard information and formats for the implementation of change.

SUMMARY OF THE INVENTION

It is desired in the industry to provide those individuals making changes to the infrastructure of a network with an efficient method, system, and means for notifying those potentially affected by a change of the change in a manner that allows them to have input in the change, ensuring that approval for change is gathered in an efficient manner, and supplying a structured system useable for making such notification with a wide variety of different types of change in multiple change categories.

The systems, methods, and means described herein are designed to promote the efficient and prompt approval of proposed changes to a network and the effective implementation of customer notification of those proposed changes among other things. Specifically, the systems, methods, and means described herein include steps for creating a change plan that comprises instructions that meet minimum requirements about how a change is to be performed, organizing a change into one of a plurality of change categories based on the nature of the change to be performed, providing said change plan to affected entities for approval, and implementing said change plan after said approval has been provided. In carrying out these steps, the change category provides rules about who should be selected as affected entities, how the affected entities should be notified of the change, and the structure that should be utilized for organizing the change.

In one embodiment of the invention, changes can be accomplished through a system, method, and means whereby the change is documented in a change ticket that includes a change plan. More particularly, the change ticket may be supplied to affected parties for approval, and to parties who will implement the change. The change is subsequently monitored for significant deviations from the change plan to insure it is completed within an allowed time frame.

In a further embodiment of the invention, notification of affected parties can take place in a specific manner whereby the change is not allowed to proceed through a step of approval or notification until an appropriate entity has signed off on their acceptance of the change. Thus the ticket is only passed on to the next actor or approver once all prior actions or approvals have been completed.

In a further embodiment of the invention, the process is either semi-automated or fully automated through the use of a work-flow engine. In one embodiment the work-flow engine comprises a computer system. The work-flow engine takes in the change ticket which is routed to a first level of affected entities. Once this first level of affected entities has approved the plan, the work-flow engine passes on the change ticket to either additional affected parties or to the entities who are responsible for the implementation of the change. Once the change has been implemented, the work-flow engine can pass on the change ticket to a group for monitoring.

In a further embodiment of this invention, the change categories correspond to whether the change is designed to be scheduled or unscheduled. A scheduled change can be work planned in advance that will be understood or expected to cause a service outage or degradation of any length on the network. It is therefore desirable that a scheduled change go through a scheduling process that allows all affected parties to coordinate when best to implement the change and create minimum disruption of the network. An unscheduled change can be certain types of change that can or should occur without scheduling overhead. In particular, routine service fulfillment work deemed low in impact and risk does not need to be formally scheduled. Further, emergency circumstances such as unexpected failure or degradation of the network can result in a need for unscheduled change or where the speed of response required for such an emergency may dictate against requiring scheduling.

In this document the following words generally have the below listed meanings, although these definitions do not limit the plain meaning or understanding by one skilled in the art of any word defined.

"Change" is used to describe any type of work performed on a network infrastructure. It may be the purposeful upgrading, changing, modification, or improvement of the system, but can also include routine service, testing, repair, or any similar activity. In addition, change includes any activity performed to place the network infrastructure back in service after it has suffered unexpected failure or degradation. It is further not required for the infrastructure to be different after a change has occurred.

"Entity" is generally a party that is capable of carrying out an action attributed to them. An entity will usually be a human being or group of human beings engaged in an employment relationship with a business that supplies the infrastructure to be changed. An entity however, need not be human, or alive, and can be any thing capable of carrying out the action including, but not limited to, a human being, a non-human animal, a legal person such as a corporation, a computer process (hardware or software), or any group of the above in any combination.

BRIEF DESCRIPTION OF DRAWINGS

FIG. 4 is an example of a change ticket designed for use across a work-flow engine comprising a computer network.

FIG. 5 is a continuation the change ticket in FIG. 4.

FIG. 6 is an example of a change schedule.

FIG. 7 is an example of a change matrix where specific types of change are associated with specific change categories represented by category codes.

DETAILED DESCRIPTION OF THE PREFERRED EMBODIMENT(S)

Although this document will discuss an embodiment comprising a hardware network change initiated by the network provider as an example, this is by no means the only type of change that is included with the scope of the invention. The process can apply to any kind of change in the infrastructure of a computer network or any change that affects operations of the network, including, but not limited to, network changes, facilities changes, or any combination of the previous. Network changes are changes comprising modification or work on the network itself and can include, but are not limited to, changing the hardware (including upgrading and replacement), changing the software (including upgrading and replacement), changing the communications within the network (including going to a new form of communication, or replacing old communication hardware or software), installation of additional equipment (For example: computers, shelves, or cards), repair of network components, testing of network components, or any of the previous in any combination. A facility related change is not directly intended to change the network, but comprises changes where the network will be affected because it effects the facilities related to the network. Facilities changes include, but are not limited to, addition, modification, destruction, construction, repair, cleaning or moving of buildings or other housings related to the network infrastructure; changing the internal layout of buildings or other housings where network resources are located; changing the layout of network resources without altering the available resources; or any of the previous in any combination. Further, the change can be initiated by any party including, but not limited to, the operator of a network, a supplier of a network, or a customer of the network.

Figure 1:
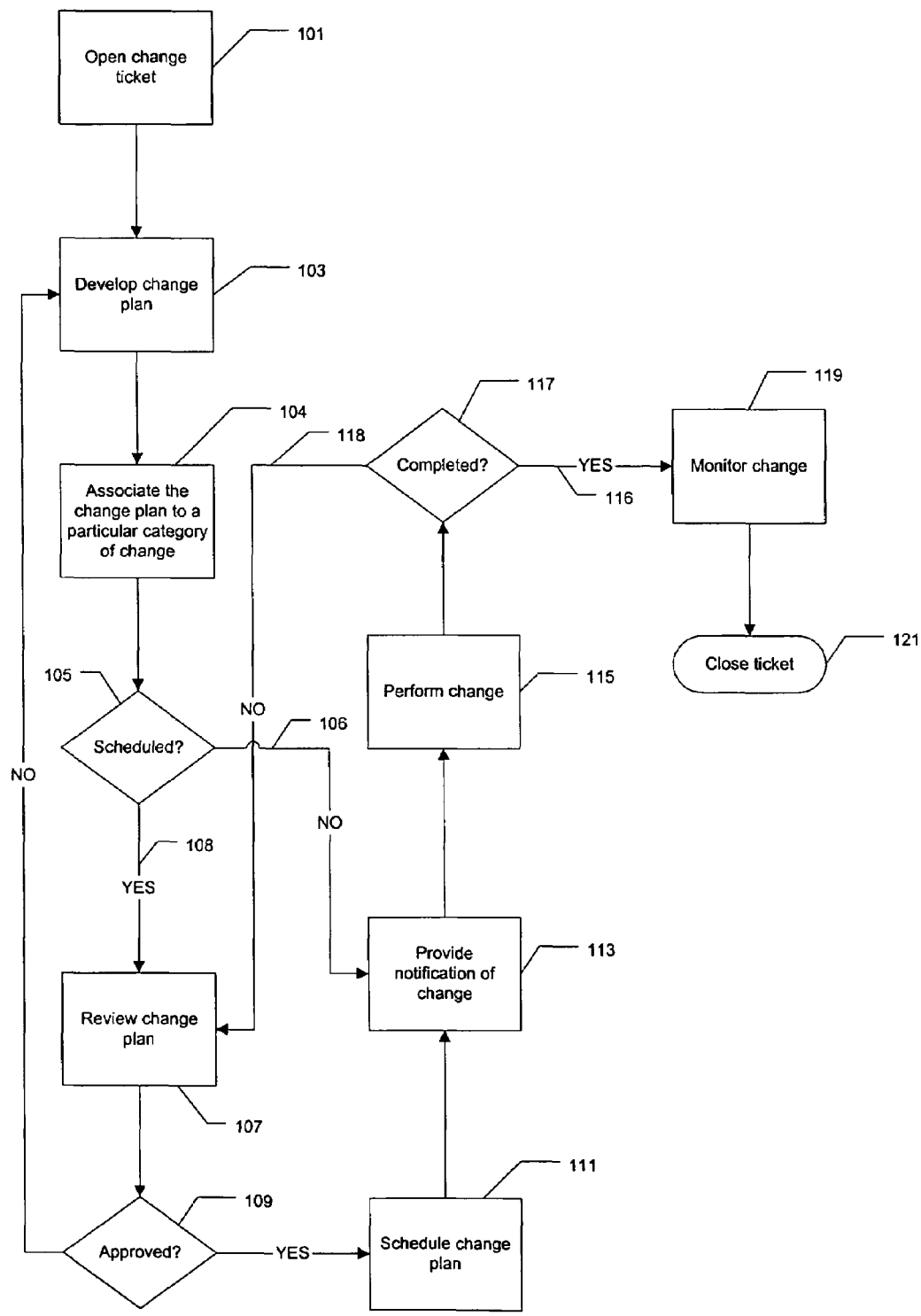
FIG. 1 is a high level drawing showing one possible flowchart of the change process of the invention.

FIG. 1 shows a high-level overview of a potential process of this invention. This figure provides a road map of the method of the invention. First, it is determined that change is needed and therefore a change ticket is opened (101) by a change author (201). The change author (201) places information for carrying out the change on the change ticket. This includes creating a change plan and any other desired information (103). A change plan is a set of instructions, however minimal, which will provide future entities examining the change plan with a sufficient idea to know how to carry out the change. The change ticket is then associated with a particular change category corresponding to the type of change that is described in the change plan (104). It is then determined how much scheduling overhead is appropriate for a change in this category. In this embodiment, the question is whether the change should be scheduled or not (105). If the change comprises a scheduled change, the change ticket is sent down a standard path (108) of approval which provides for additional overhead. If the change is unscheduled, the change is routed into an expedited path (106) where much of the overhead is bypassed in favor of response speed, or because such overhead is simply not necessary. If the standard path (108) is used, the change plan is provided to affected entities, reviewed (107) and is either approved or disapproved (109). If the change is disapproved, a new change plan needs to be generated. If the plan is approved, the change is scheduled (111). Such scheduling is generally done in a manner that is most efficient for the affected entities and minimizes network disruption. Once the change is scheduled, further notification may be provided to other entities who could be affected by the change (113). Alternatively, such notification could be provided simultaneously with the seeking of approval. At the appropriate time (either the scheduled time for a scheduled change or a selected time for an unscheduled change), the change is performed (115) and it is decided if the work has been completed (117). If additional change is necessary (for example if the change failed or if additional change is now required), the change plan can again be sent for approval (118). If the change was completed successfully, the network is monitored to insure the change was successful (119), and the change request is closed (121). This general overview provides a simple layout of the invention of this disclosure, however the paragraphs below further explain one particular method for carrying out the steps of the above described change method.

In one embodiment of the invention, the change process comprises a method for ensuring that all affected entities are notified of the change, all entities provide their approval of the change, and therefore the change is implemented with a minimum of impact. Different types of impact need to be considered in deciding who should be notified of the change, and the different types of impact depend on the type of change being carried out. Some entities which can be affected by the change include the customers of the network infrastructure. That is those whose networks run on the infrastructure that is being changed. Further affected parties can include those that are internal to the organization doing the change, or that owns the network. While these parties may not suffer the direct effects in the same way as the customers, there are entities within these groups who will need to know about the network status and/or there are entities who will be deemed to accept responsibility for the decision to carry out the change and who will need to be provided with knowledge of the change in order to accept such responsibility. Finally, the parties who are actually carrying out portions of the change, or whose areas may be affected by the physical implementation of the change will also need to be informed. The entities described in the next embodiment comprise entities that can fit in all, some, or none of these categories, but they all constitute entities that in some way are affected by the change and therefore should be notified of the change in one embodiment of this invention.

Figure 2:
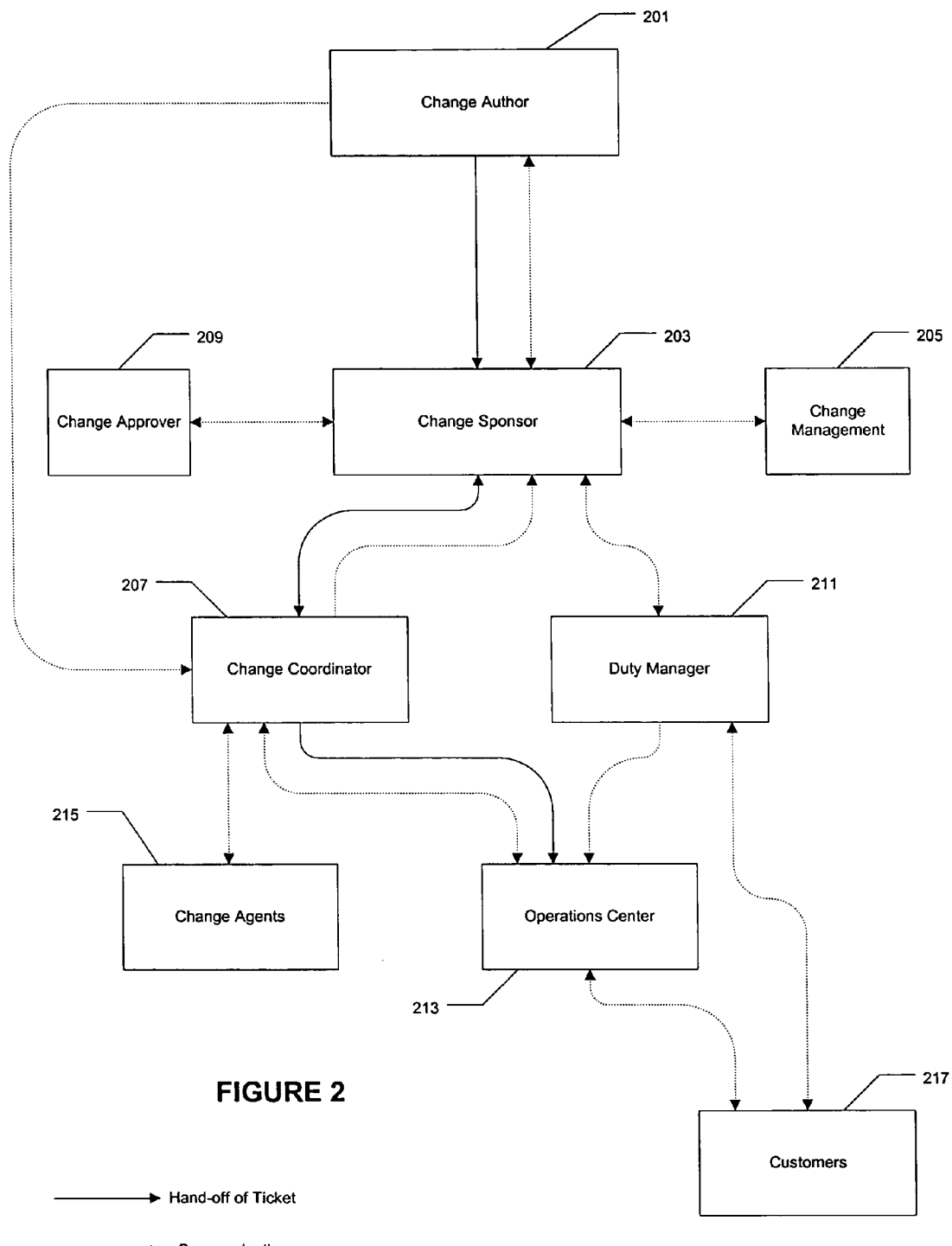
FIG. 2 is an object diagram showing one possible method of communication and passing of a change ticket between multiple different entities in the standard plan.

FIG. 2 shows a symbolic representation of one embodiment of the change process where dashed lines indicate that a communication occurs and a solid line indicates that the change ticket is handed-off to a new entity who can perform the next round of notification. The dashed lines for communication indicate that the party that does not have the change ticket is notified of its existence and their approval or comments can be solicited. The process depicted in FIG. 2 is for a standard path of approval for the change request. This path would generally be used for changes that require significant notification and approval since they are generally non-immediate, may be optional, and/or could result in a significant disruption to the network infrastructure. All communications are generally completed by the entity before they pass off the ticket to the next responsible party which insures that all desired notification occurs and entities are not inadvertently skipped. FIG. 2 specifically shows one embodiment of the invention from the point of view of the entities performing the process, instead of looking at the process itself. The change author (201) authors a change ticket and communicates with a change coordinator (207) about whether the change plan is executable as written. The change author (201) then presents the change ticket to a change sponsor (203) for approval. Once the change sponsor (203) approves of the change plan, the change sponsor (203) accepts the change ticket. The change sponsor (203) now communicates with a change approver (209) who is responsible for providing management approval for carrying out the change plan, a change management administration (205) who is responsible for scheduling and general administration of all change, a duty manager (211) who acts as a customer advocate and communicates any impact or desired information to a customers (217), and an operations center (213) regarding the change. The change sponsor (203) could also communicate directly with some of the customers (217) if the change sponsor (203) thought they were likely to suffer a greater impact as a result of the change or should otherwise be notified of the change directly. Once all the entities have been notified and they have approved the plan, the change sponsor (203) hands-off the change ticket to the change coordinator (207) who is in charge of making sure the actual change is implemented. The change coordinator (207) will need to communicate with the operations center (213) when the change is happening and with change agents (215) who will perform the physical actions required to carry out the change. During the course of the change the change coordinator (207) may be required to contact the change sponsor (203) because of problems or because higher responsibility is required. Finally, the change will either be completed, or there will be reason to continue change at a later time (for instance if the change is not completed due to an unforeseen problem, or if the change is completed but now necessitates an additional change). If the change is completed and there is no need for additional change, the change coordinator (207) hands-off the change ticket to operations center (213) for monitoring. Once it is sure that the change has been successful, the operations center (213) can close the change ticket and the change process is completed. If additional change was required, the ticket can be returned to the change sponsor (203) for additional approval and communication. Once closed, change tickets can be stored indefinitely in one embodiment of this invention or can be deleted. Such storage could be to provide an accurate record to recreate the change if later problems occur. Alternatively, the change tickets could be stored so that if a similar change occurs later less work is required, or they can be stored for any other reason including routine record-keeping or monitoring.

FIG. 2 does not show the only method for carrying out a change process. In some cases (such as routine, simple, or emergency change) there may not be a need for as much approval as the standard path provides and in such cases it would be desirable to have the change not get bogged down in unnecessary notification and approval. In particular it is desirable to allow the system to bypass some of the steps if the type of change is one where such steps are not required.

Figure 3:
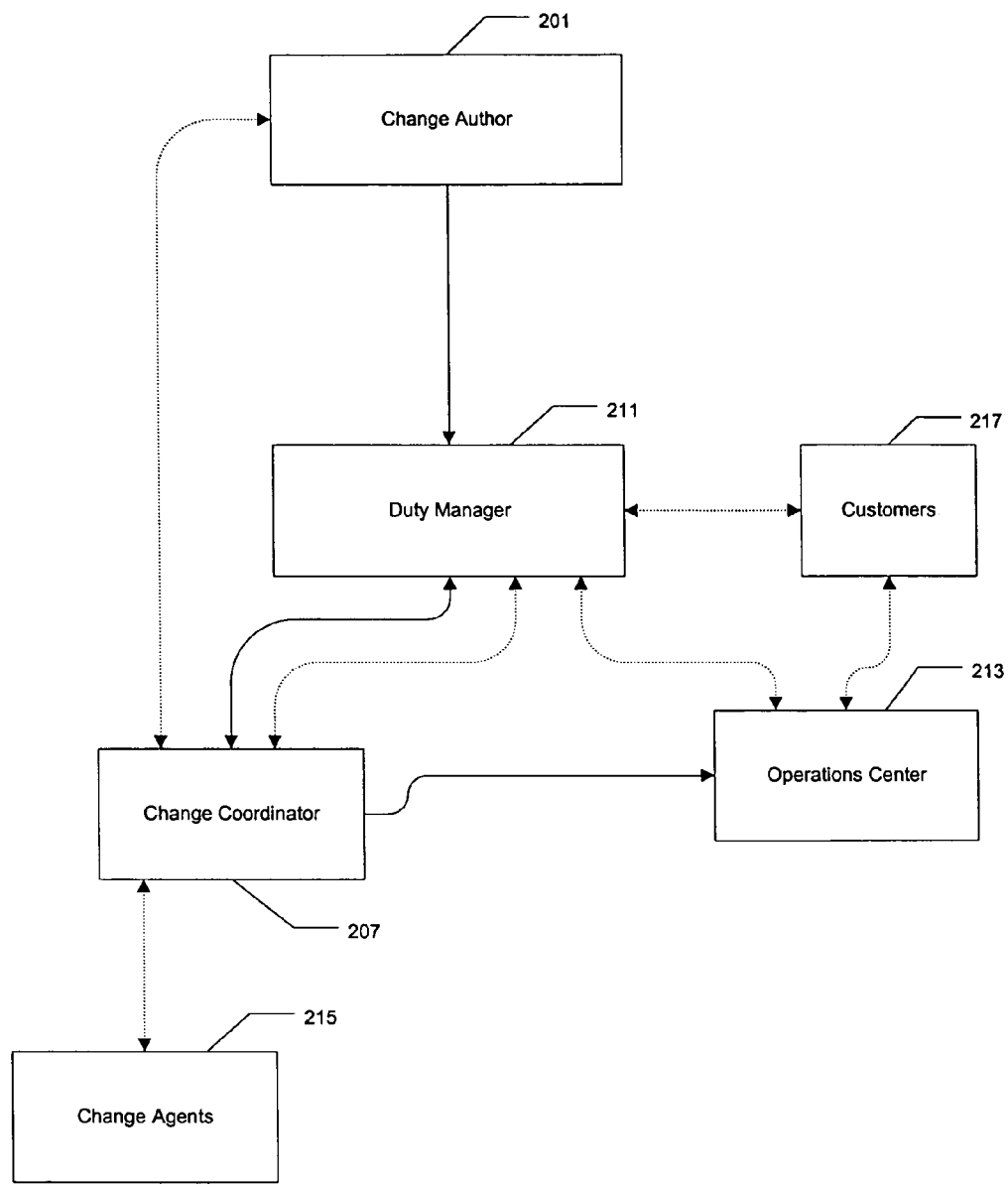
FIG. 3 is an object diagram showing one possible method of communication and passing of a change ticket between multiple different entities in the expedited plan.

FIG. 3 shows one embodiment of such an expedited review path. In the expedited review path, the change author (201) completes the same requirements for communication but now hands-off the ticket to a duty manager (211). In this path there is no separate change approver (203) and the duty manager (211) acts as a change approver (203) in many respects. Once the ticket has been handed off to the duty manager (211) the duty manager performs any necessary communication with customers (217) and the operations center (213). It should be noted that in one embodiment of the invention, some or all of this communication may not be necessary since the change is not expected to have any impact. In alternate embodiments of this invention, the communication occurs only after the change has been completed and/or only when a problem arises with the performance of the change plan. Once any necessary communication has occurred, the duty manager (211) hands-off the ticket to the change coordinator (207) who supervises the change agents (215) in the actual change. Again there is a possibility that the change can be completed, or that additional change can be required. In the former the change coordinator hands-off the ticket to operation center (213) for monitoring, while in the later the change ticket is returned to the duty manager (211) who may require further change, or can put the change request in the standard path of FIG. 2.

In the above described embodiments of this invention, various entities have been described in cursory detail. Those entities each have specific roles that they fulfill in the completion of the change management process of one embodiment of this invention and therefore the duties of each of those entities is described in further detail.

The first entity is the change author (201). The change author (201) determines that a change needs to be made. This can be its specific job, or can be because it has knowledge about a problem or other reason that the change is needed. The change author (201) can be associated with the provider of the network infrastructure, or can be from an outside vendor, or a customer. The change author (201) has the duties of opening a change ticket (101) and writing the accompanying change plan (103). In addition, the change author (201) can also be required to include additional information including information on the impact of the change, or who is involved in the change as part of the change ticket. One example of a change ticket that comprises a plan and additional information is depicted in FIGS. 4 and 5 which are discussed in greater detail later. As part of the change plan, the change author (201) can also define any requirements for specific equipment and initiate the shipping of this equipment to the facility where the work will take place.

Upon completion of the change request, the change author (201) reviews the change request with a change coordinator (207) and a change sponsor (203). It is determined at this point if the change plan is feasible and which change category is most appropriate (104) for the change provided in the change ticket. Once the change sponsor (203) has approved the feasibility of the plan and decided on its path (105), the change author (201) has passed the plan to the change sponsor (203) and can be relieved of responsibility associated with it.

If the change detailed in the change plan is one where the standard path is appropriate (108) the change sponsor (203) initiates the process of obtaining the necessary approval for scheduling and execution. The change sponsor (203) can do this by reviewing the change ticket and sending the change ticket to a change-approve mailing list. The change-approve mailing list can be a predefined or variable listing of entities who are likely to require notification of the change. The mailing list may therefore provide communication of the ticket to the change approver (209), change management administration (205), duty manager (211), change coordinator (207), and potentially select customers (217). They can further be required to insure that any personnel necessary for the change are locked into performance on the change plan (assuming that approval is given), and can be responsible for determining the best method for performing the change. Alternatively a mailing list could also be used on the expedited path although such a mailing list would likely comprise fewer entities to be contacted.

In one embodiment of the invention, the change sponsor (203) does not need to know who the appropriate entities are and they simply send the change ticket to a predetermined mailing list that notifies all necessary entities. In addition, they can also then later be notified once all these entities have given their approval. This allows the change sponsor (203) to obtain all necessary approval, even if it is blind to the process used for obtaining that approval and the entities it must seek approval from are unknown to it.

Once approval has been obtained from all necessary entities and the change has been scheduled (111) (if required), the change sponsor (203) can transfer the change request to the change coordinator (207) who can organize the change itself and supervise its execution. After passing of the change ticket, the change sponsor (203) may still have responsibilities associated with the change ticket. In particular, if there are problems with the execution of the change ticket, the change sponsor (203) may be called on to make decisions about whether to continue or terminate the proposed change.

The entities that are notified as part of the mailing list also have specific responsibilities related to approval or action on the change plan. The main responsibility of the change management administration (205) is to provide overall facilitation and administration of the change management process on an ongoing basis. The change management administration (205) comprises an entity that schedules and performs tasks related to the administration of the change process to insure that the process runs smoothly. They are generally a managerial body that accepts responsibility for the scheduling of changes, tries to prevent conflicting changes, and tries to schedule complimentary changes together. The change management administration (205) can give approval through a weekly review/lockdown meeting where all pending change requests are considered, or can use other expedited procedures if approval needs to be given faster depending on the nature of the change they are presented with.

The weekly review/lockdown meeting can comprise a standing meeting at a set time period whereby the change management administration (205) can meet and debate all change plans that have been presented to them. As part of this meeting, the change management administration (205) can review the plans for thoroughness or other desired features, can ensure that all affected parties understand the change's impact, and can place the change on a schedule to insure that the time window for the change is known and does not conflict with other scheduled changes.

The change management administration (205) may also be responsible for maintaining a change schedule that describes all pending change for a given time period to allow quick review of upcoming changes. One embodiment of such a change schedule is provided in FIG. 6 where the change is listed by its change ticket number (601) and includes numerous quick facts to provide an interested entity with a summary understanding of the change. Such a change schedule can provide additional notification, as well as serve as a planning tool, for individuals involved in the change. The change management administration (205) can further document the change procedures and provide instructions for any entity who is unsure about their role in these change procedures. Therefore, the change management administration (205) can provide all administrative tasks related to the scheduling of changes, as well as the use of the change method itself.

A further entity contacted as part of the mailing list could be the duty manager (211) who provides an overall role of customer advocacy. The duty manager (211) will provide customers (217), not directly notified by the mailing list, with appropriate notification of change within an appropriate time to allow them to respond if they have needs that should result in the rescheduling of the change, if the duty manager (211) determines that such notification is necessary. The decision of which customers (if any) to notify is generally based upon the best judgment of the entities involved in the change, with considerations usually given regarding the customer impact of the change plan or if the work has material benefit to the customers regardless of impact. Prior to sending the notification to the customers (217), the change ticket can be worded so as to put a "positive spin" on the message. It can also include a summary of what the change activity means to the customer. In order to create such notification, additional parties (for instance a marketing department) may also be involved in the notification.

The duty manager (211) can be further responsible for bringing any problems raised by the customers (217) to the attention of other parties if the customers (217) are unable or unwilling to do so themselves. If a customer (217) objects to the scheduling of the change activity, it can be the responsibility of the duty manager (211) to discuss it with the customer (217), The goal of the duty manager (211) can be to first understand the customer's (217) concern and second to promote the reasons for the change to the customer (217). If the customer (217) still objects to the change being scheduled, the duty manager (211) can initiate a discussion with the change sponsor (203), change approver (209), and/or any other entities to reschedule the change, cancel the change, or to override the customer's concerns. This allows the change to be scheduled around times inconvenient to a customer (217) and therefore cause a minimum of disruption to customers (217) if desired. Further, the duty manager (211) can be required to notify the operations center (213) to insure that internal processes are not overly disrupted by the change.

The duty manager (211) may also be called upon to act as a change approver (209) for change requests using the expedited review path. In such capacity, the duty manager (211) is required to review the change request and insure that customers (217) have notification if such notification is necessary. In addition, the duty manager (211) may need to notify the operations center (213) to deal with internal problems. They may also need to notify the operations center (213) if the change ticket is cancelled, and may need to coordinate with the change coordinator (207) and change author (201) if there are deviations from the change plan.

The operations center (213) is the entity that is primarily responsible for monitoring the operations of the network. The operations center (213) can also be responsible for helping to avoid internal disruptions of the network. In addition to, or instead of, being notified of the change as part of the mailing list, the operations center (213) can be contacted by the change coordinator (207) prior to the beginning of the change to insure there are no immediate items which should result in postponing or abandoning the change plan. They can also be notified automatically by the work-flow engine if they are appropriately connected. The operations center (213) can also be kept informed of milestones or other activities in the continuing work to insure that the course of the change is successfully monitored and, if there are immediate concerns, abandoning or altering the change plan in the midst of the change.

Change approvers (209) are entities whose approval is required or desired before the change is implemented. This can generally include specific management personnel who are likely to be affected by a change, or other authority figures who may be taking responsibility for some, or all, of the actions of the change.

The change coordinator (207) can play a dual role in the implementation of the change. They may be primarily responsible for the actual implementation of the change and the execution of the change plan as scheduled, or the change coordinator (207) can be an entity who will be affected by the change and will need to help in the scheduling and execution to avoid conflict. Prior to approval of change activity, the change coordinator (209) reviews change request/plans defined by the change author (201) to confirm that the plan is executable. After the mailing list has approved the change, the change ticket is handed-off from the change sponsor (203), and the change coordinator (207) is responsible for executing the change plan included with the change ticket. This includes distributing and reviewing the change plan with the assigned change agents (215) (who are the entities carrying out the physical labor of the change and often include the change author (201)) prior to the beginning of work and supervising the change agents (215) through the execution of the change plan (115).

The change coordinator (207) may further be responsible to provide confirmation that planned work is on track, to the operations center (213). This gives the operations center (213) a further opportunity to halt the scheduled work if there is, in that entity's determination, sufficient reason to discontinue the planned change.

During execution of the change plan by the change agents (215), the change coordinator (207) is responsible for monitoring the work as it progresses and potentially notifying the operations center (213) of progress against significant milestones defined in the change plan. This includes successful completion of, or deviation from, any of the defined milestones. Under specific circumstances, the change coordinator (207) may open discussion among affected entities to resolve disputes about any aspect of the change plan, including whether or not to continue. In certain cases, there may also be constant communication between the entities involved in the change during the execution of the plan to insure that any problems are dealt with quickly.

The change coordinator (207) is further responsible for handing the change ticket back off to the change sponsor (203) when it becomes apparent that the planned work cannot be performed as specified. Such result may come about because the work is halted before completion for any reason, the planned change is backed out because of failure to meet a milestone or because of fear of failure, or the time for the proposed change is going to be longer than was originally planned for such change.

Upon completion of planned work, the change coordinator (207) may be responsible for documenting the execution of the change plan in the change ticket including any deviations that occurred, completed and not completed milestones, and any other items of particular interest. Once the change is completed, the change coordinator (207) is generally responsible to hand off the change ticket to the operations center (213) for monitoring. If there is any follow up activity such as a additional work, or review of work, the change coordinator (207) may choose to pass the ticket back up the chain to the change supervisor (203) to schedule, organize, and/or get approval for such activity.

Finally, the change coordinator (207) can be responsible for responding to and resolving events that result from the change within a short period of time after completion. This may include re-engaging the change agents (215) involved in the work, or engaging other resources necessary to resolve a problem if such problem arises because of the change.

When the operations center (213) takes a hand-off of the change ticket from the change coordinator (207), they will generally monitor activity related to the change to determine if the change is satisfactory, if additional change needs to be completed, or if the change has caused specific problems. If there are any problems during this monitoring period, the operations center (213) can choose to open a new change ticket describing the problems and potentially cross-referencing the change ticket which led to the problem. If the change results in significant unexpected results, the operations center (213) can also request that a post-mortem meeting can be held to review the problems and the change plan, review why the change plan failed, and/or determine how to prevent similar problems in the future.

Together all of these entities can constitute all entities who are likely to be affected by a change and whose approval is desired in the implementation of the change. In some categories of change, some of these individuals may not participate, or their roles may be modified, but the process of passing the ticket in such a way to insure all desired approval is obtained comprises one embodiment of the invention.

In a further embodiment of the invention, the change process can be semi or fully automated so that entities participating need only provide approval and the change ticket can progress through the notifications without significant input from the involved entities. In yet a further embodiment of the invention, the individual entities can be blind to at least some of the other entities participating in the change process. In still a further embodiment the semi-automation of the process enables the change to be sent to all parties for approval in such a manner that all parties whose approval should be sought is sought even when the entities do not know who the other parties are.

One way to implement such a semi or fully automated change process is through the use of a work-flow engine, in particular one that is implemented over a computer network. In this implementation, the change ticket can be a computer form that the change author (201) can open and fill with suggested information. Based on the results of this information, the change ticket can then be forwarded to an appropriate change sponsor (203) for review. After review, the change sponsor (203) can send the change ticket to the mailing list which automatically selects the appropriate entities whose approval is needed for the particular change request. This can be a set group of entities, or can comprise a shifting list based on the type of change that is occurring or other specifics of the change. Alternatively, the change sponsor (203) can select from multiple different mailing lists depending on specifics of the change ticket.

As part of the above methods, a change ticket and the selection of change categories have been mentioned without much description. FIGS. 4, 5, and 7 provide specific examples of how a change ticket and a change matrix can be used to allow the categorization of change tickets and how to send the change ticket through the process.

FIGS. 4 and 5 show an embodiment of a change ticket. The change ticket in FIGS. 4 and 5 is designed to be utilized and sent across a computer network, in this embodiment via e-mail, allowing quick transfer of the information amongst the affected individuals. This change ticket is available via a network such as the World Wide Web, an Internet, or intranet system. The form has been prepared to be placed in ASCII text format in the body of the e-mail message. These specifications are, however, not necessary and other implementations of the change ticket will be apparent to those skilled in the art. Within the change ticket are certain fields for information related to the change. In particular, there is a field to provide who is the change sponsor (401), who is the change author (403) who is the change coordinator (405) and who are the change agents (407). The ticket also has a number (409) for easy reference, storage, or archival purposes.

The change ticket further can include information related to the impact of the work including the time window (413) of the proposed work, the type of impact (415), the duration of the impact (417) and an impact statement describing the exact nature of the impact (419). These sections are all used to help an entity looking at the ticket to understand what will happen when the change is begun and how that could effect the customers use of the network. The time window (413) can also provide a set time period wherein the change must be completed or halted so that any notification can include specific times of expected network degradation or unavailability. The change ticket also includes areas for the risk (423) and the priority (425) which help in determining how necessary this change is and how quickly the change ticket should be examined.

These pieces of information can be used to help determine the appropriate category code (421) for the change. The category code (421) is used in conjunction with the change matrix to determine the path that is appropriate for the given change. In this particular embodiment, the change author (201) chooses the category code (421) to correspond to one of the categories in the change matrix. The change ticket is therefore associated with the category that has the specific rules provided in the matrix. In the example in FIG. 4, the category code is S1 (422) which corresponds to a change in the category S1 (705) in the change matrix in FIG. 7.

There are also places for a summary of the change (427), a benefit statement (429) about why the change should occur, and a place for the reason for the change (431). All of these categories provide simple, up-front facts which can be used by the entities involved to make quick decisions when such speed is necessary.

There are also provided areas for success criteria (433) contingency plans (435) database changes (439) and equipment required (441). The notification section (437) can provide a listing of the customers or internal parties who should be notified of the change and may define, expand, or be separate from the mailing list. Finally, there is a section for the change plan (443) which is included separately in this change ticket.

The change plan (443) is designed to be a specific plan for implementing the change and will generally include information on how to perform the plan in at least minimal detail. The plan may, therefore, contain all, some, or none of the following with or without additional information; a work schedule with start and end dates/times; the individual responsible for the plan; and a potential outage duration. In addition the change plan (443) may comprises specific fields that describe implementation of the change during the course of the change. In particular, there may be tasks, milestones, decision points, escalation points, and alert personnel information. These specific facts provide specific desired information as part of the plan.

Tasks are individual items to be completed as part of the change plan, Therefor the change plan is broken into separate small parts that enable better monitoring of the change and, in conjunction with milestones, can be used to efficiently monitor progress.

Milestones comprise significant points in the change plan that can be used to measure progress. Milestones can identify points where it is acceptable to stop should it become necessary to stop prior to completion of the entire plan, and can also be used to insure that the change plan is on track for its time window (413).

Decision points are places in the plan where the parties will decide whether the completion of the change plan in the time window (413) is still possible. They can also represent points where a decision has to be made to continue with the change plan, or leave the change in a partially finished (but generally functional) stage.

Escalation points comprise specific decision points and milestones where escalation to a more senior party (for instance the change sponsor (203)) should be performed to communicate that the plan is or is not on track.

Alert personnel is a listing of individuals that should be notified if there is a problem with the implementation of the plan that could have an impact on the plan. It will generally include the operations center (213) and may also include other entities who will either directly be affected by a problem, or who supervise an area that might be directly or indirectly affected.

As part of the change ticket a category code (421) can be required. As was discussed above, the category code (421) is used to show the association of a particular change with a particular change category. These categories then allow change tickets to be quickly sorted by the type of notification and approval required. By consulting a change matrix, such as that provided in FIG. 7, changes within the specific categories can have specific types of path with particular rules related to the entities who need to be notified and the methods for carrying out such notification. In FIG. 7, the change matrix has categories and subcategories of change related to specific category codes (421). When a change ticket is created, it is associated with a category code (421) which corresponds to a specific category (row) of the change matrix which describes the specifics of the notification and approval required. In this way changes that are simple, routine, low-risk, or in response to emergencies can bypass the overhead for more major scheduled changes. The change matrix is further refined to allow general classes of change to be further segregated into more specific options. There are seven different types of change categories listed in FIG. 7, although that number is by no means dispositive and a change categories matrix could have more, less, or the same number of categories and still be within the scope of this invention. Those categories comprise three general categories of scheduled, unscheduled, and event response change. By selecting the appropriate category code (421) corresponding to a specific category, the type of change process used can be clear and specific choices in notifying customers, periods for scheduling the work, and notification of internal resources can be selected. FIG. 7 is meant to be one example of the type of things that can be included within a change notification matrix and it is within the scope of this invention to have any decisions be automated through the use of such a change matrix. Tasks of any type may be required, and any information can also be provided as part of a change matrix.

To describe the change matrix in further detail, it is necessary to examine the general categories and their specific subcategories. Scheduled work is generally work that can be planned in advance and causes a service outage or degradation of any length and there are three specific types S1 (705), S2 (707) and S3 (709) as can be seen in the category column (715) corresponding to these rows. Each of these subcategories applies to the types of change detailed in the description column (718). These types of change generally require management review and approval prior to being scheduled for completion, and additional notification and approval processes are desired. Cross referencing these three rows with the Mgmt. Approval column (727) makes this clear as they all require review meetings in at least expedited form. In addition, the advance customer notification column (725) shows advance notification to affected customers on the order of days. The three different categories (rows) of scheduled work correspond to the levels of risk of each of the different types and then a specific type of path or planning can be required. By using this matrix, it is possible to have changes with less risk have less review. In particular an S1 (705) or S2 (707) change has more review than an S3 (709) which is appropriate since an S1 (705) of S2 (707) involve more risk than an S3 (709) according to the description column (718).

The scheduled changes also have a different level of review than the unscheduled changes which promotes efficiency, since unscheduled changes correspond to changes which can occur without the overhead of the change management process. This essentially applies to routine work deemed low in impact and risk, non-intrusive, or routine, as well as work that is done is response to an emergency. There are two categories of basic unscheduled work U1 (711) and U2 (713). U1 (711) comprises work that is routine, but is not a formalized procedure, thus it requires some approval to insure it is scheduled appropriately. U2 (713) comprises the standard routine work done on a regular schedule and can also include work that is automated or semi-automated. This type of change requires very minimal processing involving virtually no notification or approval.

Event responses are the final type of classification of change and comprise unscheduled change that is necessary in response to a current or imminent service outage or degradation. A fast-track to notification and approval is desired to rapidly return the network to full functionality. There are again two classes of event response changes E1 (701) and E2 (703) that differ on the potential for future outages or problems associated with correcting the current problem. Since these types of change are to change a network that is already suffering degradation or outage, they have some of the fastest approval processes to get the network infrastructure fully functional again.

While the invention has been disclosed in connection with the preferred embodiments shown and described in detail, various modifications and improvements thereon will become readily apparent to those skilled in the art. Accordingly, the spirit and scope of the present invention is to be limited only by the following claims.

What is claimed is:

1. A method for managing the changing of a network infrastructure, comprising:
    opening a change ticket that includes a change plan having instructions about how a change is to be performed;
    associating said change ticket with one of a plurality of change categories corresponding to a type of change that is described in the change plan;
    providing said change ticket to affected entities for approval, wherein the affected entities comprise at least one entity other than a system administrator; and
    implementing said change plan after the affected entities have approved the change ticket;
    wherein said affected entities are selected based on, and said change ticket is approved in accordance with, rules related to each of said change categories into which said change ticket was associated.

2. The method of claim 1, wherein said affected entities are unknown to at least one other entity involved in said method.

3. The method of claim 1, wherein said change ticket is accessible by a work-flow engine.

4. The method of claim 3, wherein said work-flow engine is implemented through use of a computer system.

5. The method of claim 1, wherein said affected entities comprise at least one of a customer, a duty manager, a change coordinator, a change approver, and an operations center.

6. The method of claim 1, wherein said change categories include at least one of a scheduled change, an unscheduled change, and an event response.

7. A system for managing the changing of a network infrastructure, comprising:

a work-flow engine;

a change ticket comprising a change plan including instructions about how a change is to be performed, said change ticket being present in a form that can be used by said work-flow engine; and responsible entities connected to said work-flow engine whose approval of the change ticket is required before said change plan can be implemented, wherein the responsible entities comprise at least one entity other than a system administrator;

wherein said change ticket is organized into one of a plurality of change categories based on the nature of said change, and said work-flow engine provides said change ticket to said responsible entities for approval.

8. The system of claim 7, wherein said work-flow engine comprises a computer system.

9. A method for managing the changing a network infrastructure, comprising:

a change author having the duties of proposing a proposed change and authoring a change ticket;

a change sponsor having the duties of seeking approval for said proposed change from affected entities, which comprise at least one entity other than a system administrator;

a change coordinator having the duties of coordinating and carrying out the proposed change and;

an operations center having the duties related to the monitoring of said network;

wherein said change author authors said change ticket to include a change plan for implementing said proposed change, said change ticket being passed to said change sponsor when said change author has completed its duties, said change sponsor passing said change ticket to said change coordinator when said change sponsor has completed its duties, and said change coordinator passing on said change ticket to said operations center when said change coordinator has completed its duties, said operations center being responsible for closing said change ticket.

10. The method of claim 9, wherein said change ticket is a computer construct which can be passed through electronic means.

11. A means for managing the changing of the infrastructure of a network comprising:

authoring means for generating a change ticket having a change plan that includes instructions about how a change is to be performed;

change matrix means for associating said change with one of a plurality of change categories;

communication means for providing said change ticket to affected entities for approval, wherein the affected entities comprise at least one entity other than a system administrator; and agent means for implementing said change plan after the affected entities have approved the change ticket;

wherein said affected entities are selected based on, and said change ticket is approved in accordance with, rules related to said change category into which said change was associated.

* * * * *